(12) United States Patent
Richards et al.

(10) Patent No.: US 11,318,671 B2
(45) Date of Patent: May 3, 2022

(54) SYSTEM AND METHOD FOR SHEETING AND STACKING 3D COMPOSITE PRINTED SHEETS

(71) Applicant: Xerox Corporation, Norwalk, CT (US)

(72) Inventors: Paul N. Richards, Fairport, NY (US); Paul M. Fromm, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 22 days.

(21) Appl. No.: 16/418,577

(22) Filed: May 21, 2019

(65) Prior Publication Data
US 2020/0368965 A1 Nov. 26, 2020

(51) Int. Cl.
| | |
|---|---|
| *B29C 64/236* | (2017.01) |
| *B29C 64/147* | (2017.01) |
| *G03G 15/00* | (2006.01) |
| *B29C 64/209* | (2017.01) |
| *B33Y 10/00* | (2015.01) |
| *B29C 64/386* | (2017.01) |

(Continued)

(52) U.S. Cl.
CPC .......... *B29C 64/236* (2017.08); *B29C 64/147* (2017.08); *G03G 15/224* (2013.01); *B29C 64/165* (2017.08); *B29C 64/188* (2017.08); *B29C 64/205* (2017.08); *B29C 64/209* (2017.08); *B29C 64/245* (2017.08); *B29C 64/35* (2017.08); *B29C 64/386* (2017.08); *B29C 64/393* (2017.08); *B33Y 10/00* (2014.12)

(58) Field of Classification Search
None
See application file for complete search history.

(56) References Cited

U.S. PATENT DOCUMENTS

| | | |
|---|---|---|
| 3,473,205 A | 10/1969 | Zocher |
| 3,774,273 A | 11/1973 | Okamoto et al. |

(Continued)

FOREIGN PATENT DOCUMENTS

| | | |
|---|---|---|
| EP | 2776233 | 12/2017 |
| WO | WO2014134224 | 9/2014 |

OTHER PUBLICATIONS

Wikipedia (2018). Augmented Reality. Wikipedia, the free encyclopedia. Dec. 6, 2018 from https://en.wikipedia.org/wiki/Augmented_reality.

(Continued)

*Primary Examiner* — Linda L Gray
(74) *Attorney, Agent, or Firm* — Caesar Rivise, PC

(57) ABSTRACT

A web sheet processing system for cutting and/or stacking AM composite printed sheets from the web combines web edge waste with the cut sheets, stacking the waste with the 3D object. The waste may be removed during the cleaning of the 3d object (e.g., by abrasive blasting, chemical removal, dissolution) to result in a 3D printed object. This approach eliminates the separate need for waste removal of a rewound web of substrate material waste. In examples, a tractor drive transport assembly ensures consistent web/sheet motion via tractor feeding along the edges of the web/sheet to a stacker subsystem. The tractor drive transport assembly, in combination with a drive guide, positions the cut sheets over the stacker subsystem for release onto the top of a stack, with the substrate waste that would normally be processed downstream stacked with the 3D object for removal during a normal cleaning of the object.

20 Claims, 8 Drawing Sheets

(51) Int. Cl.
  *B29C 64/188* (2017.01)
  *B29C 64/393* (2017.01)
  *B29C 64/205* (2017.01)
  *B29C 64/35* (2017.01)
  *B29C 64/165* (2017.01)
  *B29C 64/245* (2017.01)
  *G03G 15/22* (2006.01)

(56) References Cited

U.S. PATENT DOCUMENTS

| | | | |
|---|---|---|---|
| 4,758,107 A * | 7/1988 | Sakai | B41J 11/30 |
| | | | 226/196.1 |
| 5,173,733 A | 12/1992 | Green | |
| 5,943,125 A | 8/1999 | King et al. | |
| 6,377,758 B1 | 4/2002 | OuYang et al. | |
| 7,050,078 B2 | 5/2006 | Dempski | |
| 7,324,081 B2 | 1/2008 | Friedrich et al. | |
| 7,463,149 B2 | 12/2008 | Friedrich et al. | |
| 8,116,585 B2 | 2/2012 | Wu et al. | |
| 8,496,370 B2 | 7/2013 | Hsu | |
| 8,756,894 B2 | 6/2014 | Swartz et al. | |
| 8,786,686 B1 | 7/2014 | Amirparviz | |
| 9,266,287 B2 | 2/2016 | Kautz et al. | |
| 9,393,770 B2 | 7/2016 | Swartz et al. | |
| 9,507,788 B2 | 11/2016 | Pavlov et al. | |
| 9,683,950 B2 | 6/2017 | Sarrazin et al. | |
| 9,740,974 B2 | 8/2017 | Kumar et al. | |
| 9,776,376 B2 | 10/2017 | Swartz et al. | |
| 9,827,754 B2 | 11/2017 | Swartz et al. | |
| 9,833,949 B2 | 12/2017 | Swartz et al. | |
| 10,046,552 B2 | 8/2018 | Swartz et al. | |
| 10,723,072 B1 * | 7/2020 | Zeman | G03G 9/08 |
| 2002/0133264 A1 | 9/2002 | Maiteh et al. | |
| 2006/0255525 A1 | 11/2006 | Dinatale et al. | |
| 2013/0171431 A1 | 7/2013 | Swartz et al. | |
| 2014/0085620 A1 | 3/2014 | Lobovsky et al. | |
| 2014/0238173 A1 | 8/2014 | Swartz et al. | |
| 2014/0257549 A1 | 9/2014 | Swartz et al. | |
| 2015/0034123 A1 | 2/2015 | Pressacco et al. | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0260261 A1 | 9/2016 | Hsu | |
| 2016/0297142 A1 | 10/2016 | Bheda et al. | |
| 2016/0339645 A1 | 11/2016 | Swartz et al. | |
| 2017/0106586 A1 | 4/2017 | Keoshkerian et al. | |
| 2017/0144426 A1 | 5/2017 | Moore et al. | |
| 2017/0151719 A1 | 6/2017 | Swartz et al. | |
| 2017/0291223 A1 | 10/2017 | Swartz et al. | |
| 2017/0297303 A1 | 10/2017 | Swartz | |
| 2017/0368744 A1 | 12/2017 | Zona et al. | |
| 2018/0008141 A1 | 1/2018 | Krueger | |
| 2018/0022065 A1 | 1/2018 | Swartz et al. | |
| 2018/0072001 A1 | 3/2018 | Swartz et al. | |
| 2018/0141305 A9 | 5/2018 | Swartz et al. | |
| 2018/0264725 A1 | 9/2018 | Swartz et al. | |
| 2018/0264732 A1 | 9/2018 | Swartz et al. | |
| 2019/0067077 A1 | 2/2019 | Muramoto | |

OTHER PUBLICATIONS

Impossible Objects' CBAM Pilot Project (video), https://www.youtube.com/watch?v=Dn37IXU2K0M, retrieved Dec. 12, 2018.

* cited by examiner

SYSTEM AND METHOD FOR SHEETING AND STACKING 3D COMPOSITE PRINTED SHEETS

FIELD OF DISCLOSURE

This disclosure relates generally to systems and methods for composite-based additive manufacturing, and more particularly, to implementing a comparatively higher speed process for cutting web fed substrate material into sheared and stacked individual substrate sheets in the process of building up printed substrate sheet layers configured to form and/or manufacture three-dimensional objects, parts and components (3D objects).

BACKGROUND

Traditional object, part and component manufacturing processes, which generally included varying forms of molding or machining of output products, have expanded to include commercial implementations of a new class of techniques globally referred to as "additive manufacturing" or AM techniques. These AM techniques generally involve processes, alternatively referred to as "Solid Freeform Fabrication (SFF)" or "3D printing" in which layers of additive materials, sometimes toxic or otherwise hazardous in an unfinished state are sequentially deposited on an in-process 3D object according to a particular material deposition and curing scheme. As each layer is added in the 3D object forming process, the new layer of material is added and adhered to the one or more already existing layers. Each AM layer may then be individually cured, at least partially, prior to deposition of any next AM layer in the 3D object build process. This sequential-layer material addition/joining throughout a 3D work envelope is executed under automated control of varying levels of sophistication.

AM manufacturing techniques include, but are not limited to, those techniques that have come to be referred to broadly as "3D printing" techniques usable for producing 3D printed objects. 3D printing techniques employ one or more processes that are adapted from, and appear in some respects to be similar to, well-known processes for forming two-dimensional (2D) printed images on image receiving media substrates. Significant differences in the output structures produced by the 3D printing techniques are generally based on (1) a composition of the deposited materials that are used to form the output 3D printed objects from the 3D printer; and/or (2) a number of passes made by the "print" heads in depositing comparatively large numbers of successive (and very thin) layers of the deposition material to build up the layers to the form of the output 3D printed objects.

A number of powder-based AM techniques have been commercialized. These include Selective Laser Sintering (SLS), as well as certain adaptations of toner-based 2D printing technologies for 3D printing. Those of skill in the art recognize that, in certain of these implementations, no separate support structures are typically required to support the creation of certain complex shapes. In certain of these processes, powdered materials are selectively consolidated into 3D objects with excess powder being manually removed. In an SLS process, for example, a thin layer of powder is deposited in a workspace container and the powder is then fused together using a laser beam that traces the shape of the desired cross-section. The process is repeated by depositing layers of powder thus building the 3D object in this manner layer by layer. In a typical toner-based 3D printing process, a binder material selectively binds powder deposited in layers in a printing technology used to generally print the binder in a shape of a cross-section of the 3D object on each layer of powder.

An expanding number of AM or 3D printing processes and techniques are now available. Principal distinguishing characteristic between the multiplicities of these AM or 3D printing processes are in the manner in which the layers are deposited to create the output 3D objects, and in the materials that are used to form the output 3D objects.

Certain of the AM techniques (as this term will be used throughout the balance of this disclosure to refer to various 3D object layering and build techniques including 3D printing) melt or soften materials to produce the build layers using techniques such as, for example, selective laser melting or sintering of an input material through applied heat. Others of the AM manufacturing techniques deposit and cure liquid materials using technologies for the deposition of those liquid materials such as jetted (ink) material "printing" techniques.

Some 3D printers use a process of printing plastic in the image of the part cross section onto fibrinous sheets of a substrate web, such as carbon fiber, and then later stacking many sheets to form a stack that will become a 3D object after the stack is heated to melt or cure the plastic and the stack compressed. Excess substrate web material may be rerolled and removed. It would be beneficial to increase efficiencies in the sheeting and stacking of the sheets, especially where such efficiencies eliminate the need for waste rewinding and removal.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a web sheet processing system for stacking additive manufacturing composite printed sheets, including a tractor drive transport assembly and a drive guide. The tractor drive transport assembly may be positioned above a stacker subsystem of an additive manufacturing device, and include a base and a registration pin extending upwards from the base. In embodiments, the tractor drive transport assembly includes a tractor drive transport having a drive belt with a plurality of knobs spatially gapped and protruding outwardly from the drive belt. The plurality of knobs is spaced to align with and protrude a plurality of tractor feed apertures in one of a plurality of an additive manufacturing composite printed sheet. The drive belt is configured to pull the composite printed sheet over the stacker subsystem until a registration aperture of the composite printed sheet is in alignment over the registration pin of the stacker subsystem. The drive guide is configured to temporarily support the composite printed sheet while the composite printed sheet is pulled over the stacker subsystem. The drive guide withdraws from contact with the composite printed sheet upon alignment of the registration aperture over the registration pin to release the composite printed sheet from the tractor drive transport to the stacker subsystem with the registration pin through the registration aperture.

According to aspects illustrated herein, a web sheet processing method for stacking additive manufacturing composite printed sheets includes pulling one of a plurality of composite printed sheets over a stacker subsystem of an additive manufacturing device until a registration aperture of the composite printed sheet is in alignment over a registration pin of the stacker subsystem with a tractor drive transport assembly positioned above the stacker subsystem, the stacker subsystem including a base and a registration pin extending upwards from the base, the tractor drive transport assembly including a tractor drive transport having a drive belt with a plurality of knobs spatially gapped and protruding outwardly from the drive belt, the plurality of knobs being spaced to align with and protrude a plurality of tractor feed apertures in an additive manufacturing composite printed sheet, the drive belt configured to pull the composite printed sheet over the stacker subsystem until the registration aperture of the composite printed sheet is in alignment over the registration pin of the stacker subsystem. The method further includes supporting the composite printed sheet while the composite printed sheet is pulled over the stacker subsystem with a drive guide in contact with the composite printed sheet, and withdrawing the drive guide from contact with the composite printed sheet upon alignment of the registration aperture over the registration pin to release the composite printed sheet from the tractor drive transport to the stacker subsystem. In examples, the method may also include forwarding a printed substrate material web in a process direction towards the tractor drive transport assembly with a transfer subsystem, the printed substrate material web including additional tractor feed apertures, with the transfer subsystem including the tractor drive transport assembly and a second tractor drive transport upstream the tractor drive transport, the second tractor drive transport having a second drive belt with a plurality of knobs spatially gapped and protruding outwardly from the second drive belt to protrude the additional tractor feed apertures and forward the printed substrate material web in the process direction. In examples, the method may further include cutting the plurality of composite printed sheets from the printed substrate material web with a web cutter upstream the tractor drive transport assembly, the web cutting extending across an entire width of the printed substrate material web, the cutting terminating the printed substrate material web at the web cutter with only the plurality of cut composite printed sheets continuing downstream the web cutter.

According to aspects described herein, a web sheet processing system of an additive manufacturing system includes a transfer subsystem, a web cutter, a stacker subsystem, a tractor drive transport assembly, and a drive guide. In embodiments, the transfer subsystem supports and forwards a substrate material web in a process direction through the additive manufacturing system, with the substrate material web having two edges defining a width of the substrate material web and a plurality of tractor feed apertures. The web cutter extends across the width of the substrate material web to cut a plurality of composite printed sheets from the substrate material web, with each of the plurality of composite printed sheets including a registration aperture and at least two of the plurality of tractor feed apertures. The stacker subsystem is downstream the web cutter in the process direction and includes a base and a registration pin extending upwards from the base. The tractor drive transport assembly is positioned above a stacker subsystem and includes a tractor drive transport having a drive belt with a plurality of knobs spatially gapped and protruding outwardly from the drive belt. The plurality of knobs is spaced to engage the plurality of tractor feed apertures in the plurality of composite printed sheets. The drive belt is configured to pull one of the composite printed sheets over the stacker subsystem until the registration aperture of the composite printed sheet is in alignment over the registration pin of the stacker subsystem. The drive guide is configured to temporarily support the composite printed sheet being pulled by the drive belt over the stacker subsystem. The drive guide withdraws from contact with the composite printed sheet upon alignment of the registration aperture over the registration pin to release the composite printed sheet from the tractor drive transport to the stacker subsystem with the registration pin through the registration aperture. The transfer subsystem includes a second tractor drive transport upstream the tractor drive transport assembly, with the second tractor drive transport having a second drive belt with a plurality of knobs spatially gapped and protruding outwardly from the second drive belt to engage the plurality of tractor feed apertures of the substrate material web and forward the substrate material web in the process direction.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
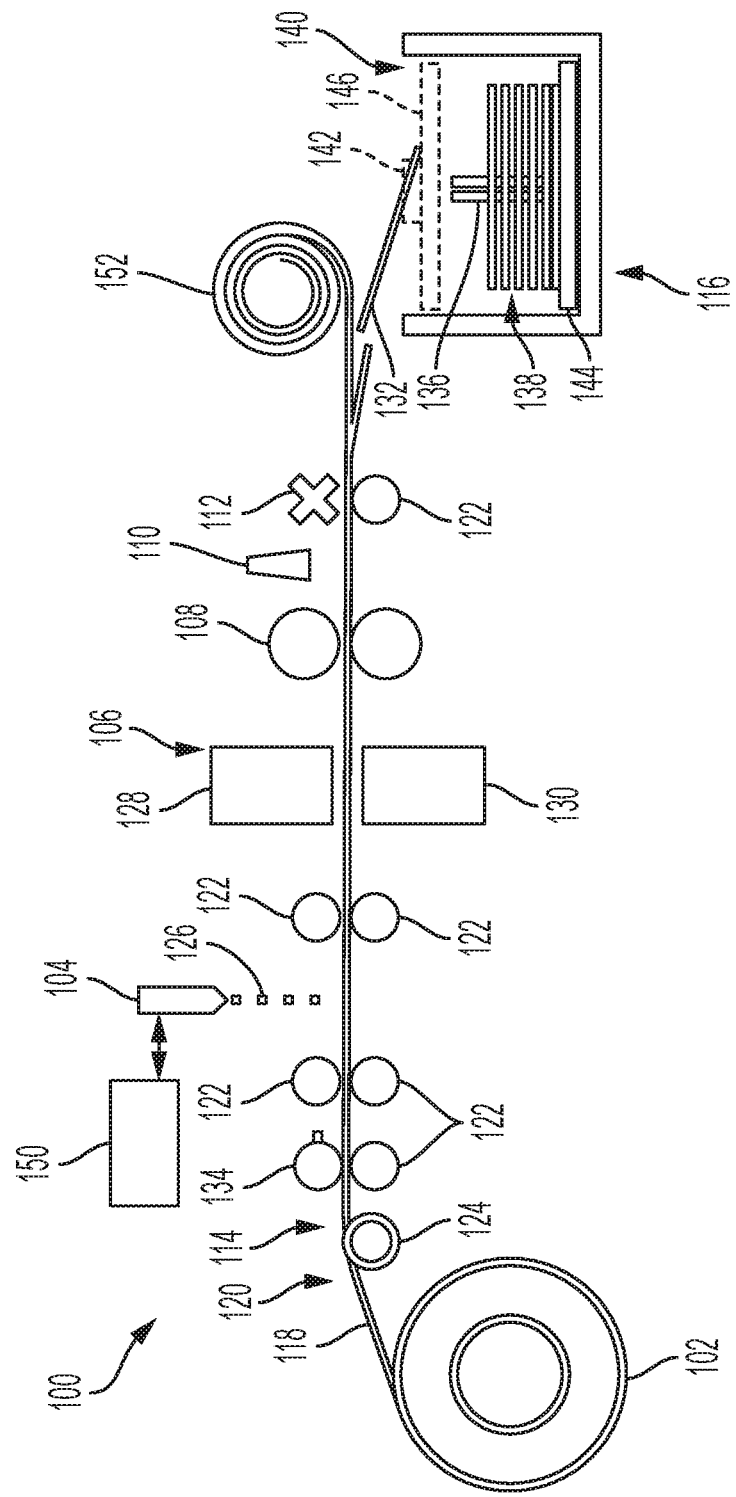
FIG. 1 is a side view of an additive manufacturing (AM) system for printing 3D objects in accordance with an example of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing onto a substrate web and automatically stacking individual sheets of the web for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, carbon fiber reinforced material and foils, as readily understood by a skilled artisan.

The term "marking material" as used herein may refer to printing matter deposited by an image forming device onto a web substrate to form an image on the substrate. The listed term "marking material" may include inks, toners, metal particles, plastics, pigments, powders, molten materials, polyamide, nylon, glass filled polyamide, epoxy resins, bio-based resins, wax, graphite, graphene, carbon fiber, photopolymers, polycarbonate, polyethylene, Polylactic acid (PLA), Polyvinyl alcohol (PVA), ABS filament, high-density polyethylene (HDPE), high impact polystyrene (HIPS), Polyethylene terephthalate (PETT), ceramics, conductive filament and other ink jet materials.

The term "image forming device", "printing device" or "printer" as used herein encompasses any apparatus that performs a print outputting function for any purpose, such as a digital copier, scanner, image printing machine, xerographic device, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. An image forming device can handle sheets, webs, marking materials, and the like. An image forming device can place marks on any surface, and the like and is any machine that reads marks on input sheets; or any combination of such machines. A 3D printer can make a 3D object, and the like. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

As used herein, unless otherwise specified, the term "object" can also mean part, element, piece, or component. As used herein, an object refers to a 3D object to be individually built, or actually built, by a 3D printing system (printer). An object, as referred herein, is built by successively adding layers so as to form an integral piece. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

FIG. 1 is a block diagram of an exemplary AM system 100 for printing 3D objects. The AM system 100 may include components such as a material feeder 102, an image-forming device 104, a powder subsystem 106, a fuser 108, a sensor 110, a cutter 112, a transfer subsystem 114, a stacker subsystem 116, and other features that connect and control the various components. While exemplary components are shown in FIG. 1, various alternative and optional components are also suitable for use with the system 100.

In illustrative implementations, a three-dimensional (3D) object is printed in accordance with a computer 3D model of the object, created by a computer-aided design (CAD) program. For example, the CAD program may be a free-form non-uniform rational basis spline (NURBS) program, or the CAD program may be Solid Works®. In the AM system 100, marking material 148 (e.g., powder) (FIG. 4) is selectively deposited by powder subsystem 106 in a physical pattern on a substrate material 118 (or substrate sheets thereof) that corresponds to a "positive image" of a thin slice or layer of the 3D object as defined by image forming device 104. For each slice of the 3D object, powder is attached in a pattern that correspond to positions in the slice where the 3D object exists, and powder is not attached to the substrate in positions in the slice where the 3D object does not exist. Thin slices of the 3D CAD model may be created, for example, by starting with a 3D model in STL file format and using the Slice Commander feature of Netfabb® Studio software (available from Netfabb GmbH, Parsberg, Germany) to create the thin slices. This cycle of selectively patterning substrate sheets repeated for as many additional substrate sheets as required for making the specified 3D part or object, with each sheet normally representing a layer of the 3D part or object.

The material feeder 102 holds the substrate material 118 (e.g., carbon fiber, paper) in roll or sheet form (here shown in roll form for example) and places the substrate material in proper position for transfer to the image-forming device 104. The substrate material 118 may be transferred to the image-forming device 104 via the transfer subsystem 114, which may include a tensioning mechanism 120 together with feed rollers 122 used to hold and advance the web defined by the length of the substrate material fed through the AM system 100. The tensioning mechanism 120 may include one or more rollers 124 situated to keep the substrate material 118 taught as it is fed components of the AM system. The web of substrate material 118 can extend through all of the components of the AM system, including the image-forming device 104, the powder subsystem 106, the fuser 108, the sensor 110, and then be cut by the cutter 112 into single sheets prior to stacking, as discussed in greater detail below.

The image-forming device 104 may then deposit a pattern of an adhering agent (e.g., fluid 126) in image-wise fashion at precise locations onto the substrate material 118. The fluid 126 is selectively deposited on the substrate material 118 so that some parts of the material are covered with liquid as a positive image of a slice of a 3d object, and some parts of the material are not. The pattern of fluid 126 may be deposited via a variety of approaches. For example, the image-forming device 104 may include a thermal inkjet head or a piezoelectric inkjet head to dispense the fluid. In examples, the image-forming device 104 may apply air pressure to dispense the fluid 126. The image-forming device 104 may also include a solenoid valve if air pressure is used to control the release of air or dispensing of fluid.

In some cases, the fluid that is selectively deposited may be water or an aqueous solution that includes a material that slows the evaporation of water. For example, the aqueous solution may include 2-pyrrolidinone. In other cases, a different fluid, such as an alcohol may be selectively deposited. For example, if the substrate material 118 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it is helpful to apply a surface energy modifier or repellent to the substrate before selectively depositing the liquid fluid.

The material feeder 102 then transfers the substrate material 118 to the powder subsystem 106, which includes a powder applicator 128 and a powder remover 130 that may be provided as separate components or integrated into a single component. In either arrangement, the powder applicator 128 is configured to deposit a 3D object powder (e.g., thermoplastic powder) onto the substrate material. The powder is configured to adhere to the areas of the substrate that have been made wet by the image-forming device 104, i.e., the layer images. In other words, the powder applicator 128 deposits powder, such as, but not limited to, thermoplastic powder, onto the surface of the substrate material 118 on which patterned layer shapes have just been printed. The powder sticks to the printed (wet) areas on the substrate material or sheet thereof, but does not adhere to portions of the substrate that are not covered with the fluid.

In typical application, the powder applicator 128 may include a trough containing the powder. The trough may have a slotted opening on its underside and is connected to an electromechanical vibrator of the powder subsystem. The vibrator, when active, causes the powder to flow downward through the slotted opening and out of the trough onto the substrate while it moves under the trough. The vibrator is actuated by a controller 150 that may include a sensor circuit that senses the presence of the patterned fluid on the substrate underneath. When the patterned fluid has completely passed, the vibrator may deactivate to cease powder flow from the trough.

The powder may be selectively deposited by other approaches. For example, the powder may be selectively deposited by flooding one side of a layer of substrate with powder, then selectively heating the opposite side of the substrate with an appropriate device such as a thermal print head. In this approach, the thermal print head includes a high-resolution array of heating elements, which may be selectively turned on or off. In the areas that are heated, the powder melts and adheres to the substrate. The excess powder that has not adhered is removed, for example by vacuuming the excess powder by the powder remover 130 or turning the substrate over with the excess powder falling off the substrate via gravity.

Alternatively, powder may be deposited using a selective deposition technique similar to that employed in xerographic printing. In this approach, an electrical charge is imparted to powder particles, which are directed toward the substrate 118 and then selectively adhere to some portions of the substrate, but not others due to electrostatic attraction or repulsion. The powder particles adhere to portions of the substrate that have an opposite electrical charge, or that are adjacent to a substrate surface that has such a charge, and are repelled from portions of the substrate that have the same electrical charge or that are adjacent to a substrate surface that has such a charge.

The powder may be alternatively deposited using a selective deposition technique similar to that employed in magnetographic printing. In this approach, powder selectively adheres to some portions of the substrate layer, but not others due to magnetostatic interactions between the powder and the substrate surface, or a substrate layer adjacent to the substrate surface. For example, the powder may be a single component magnetic toner, a colloidal suspension (e.g., a ferrofluid), or a dual component toner. A variety of magnetic pigments, such as magnetite or ferric oxide (FeO), may be used for the toner powder in this approach.

In all of the above examples, the step of selectively depositing powder may include a substep of directing solid powder toward the substrate 118 in a non-selective manner. For example, this substep may include flooding the entire surface of the substrate with powder. Or for example, in the xerographic or magnetographic examples, this substep may include sending electrically charged or magnetized powder toward the entire substrate layer.

Still referring to FIG. 1, the powder remover 130 then removes any powder that does not adhere to the substrate. The powder may be removed from the substrate, for example, by vacuuming the excess powder off as it moves adjacent the powder remover. In typical application, the powder remover 130 may include a vacuum having a vacuum motor coupled to a cyclone (to be described later). In operation, the vacuum pulls the powder that does not adhere to the substrate, while powder applied to the printed areas remain. The cyclone may recirculate the vacuumed powder back to the powder applicator 128 for reuse, as well understood by a skilled artisan. In certain circumstances the amount of powder removal from the vacuum may be insufficient since some unwanted powder may still reside on the substrate material. For this reason the powder remover 130 may include an air knife after the vacuum to remove any remaining excess powder from the substrate. The removed excess powder may also be recirculated by the cyclone back to the powder applicator for reuse.

The powder system 106 can be set to run continuously so that, once the substrate material 118 passes the image forming device 104, the substrate automatically travels through the powder system 106. Alternatively, the controller 150 in communication with the transfer subsystem 114, the image forming device and the powder system 106 can instruct the powder applicator 128 and powder remover 130 or subsystems thereof to turn on and off at the appropriate times.

After the substrate 118 has had powder applied and excess powder removed, the remaining powder may be melted onto the substrate so that the powder more permanently affixes to the printed areas of the substrate and is thus protected from displacement, disruption, or falling off during subsequent processing steps. To this end, an optional fuser 108 may be disposed after the powder system 106. The fuser 108 may be disposed above, below, or adjacent to the substrate leading out of the powder remover 130. The fuser 108 may be, for example but not limited to, radiant, IR, or other heating approach sufficient to melt and thereby fix the patterned powder to the substrate. As the substrate 118 travels out of the powder system 106, the heat from the fuser 108 melts the powder on the substrate surface causing it to fix to the substrate.

The AM system 100 may optionally have a sensor 110 (e.g., an imaging device such as a camera) to ensure that the system has not malfunctioned, that the appropriate amount of powder is deposited, that the substrate material is moving as desired, that individual substrate sheets are moving as desired, and other quality assurance aspects of the process. The sensor may operate based, for example, on input from the controller 150, or automatically upon detection of an edge of printed material or a substrate sheet.

As noted above in the exemplary AM system 100, the substrate material 118 is mounted and situated ahead of the image-forming device 104. While not being limited to a particular theory, the web of substrate material 118 can extend through all of the components of the AM system, including the image-forming device 104, the powder subsystem 106, the fuser 108, the sensor 110, and then be cut by the cutter 112 into single sheets 132 prior to stacking, with the sheets corresponding to a layer of a 3D object. This cutting separates the single sheets 132 from the web of substrate material 118, and uncut portions of the web not separated into the printed single sheets may continue and be rewound as a web of substrate material waste 152. The web of substrate material waste 152 may include the uncut portions of the web surrounding the separated sheets 132 that are stacked at the stacker subsystem 116. In examples, the web of substrate material 118 may be cut by the cutter 112 into single sheets 132 at any prior point in the process. For example, the web may be converted to single sheets prior to advancing the resulting substrate sheets to the image-forming device 104. Likewise, single sheets may be cut from the web of substrate material 118 after the image-forming device 104 and before the powder subsystem 106, or after the powder subsystem and before the fuser 108, or after the fuser and before the sensor 110. In examples, the web may be precut into individual sheets, with the sheets arranged as a stack of sheets held by the material feeder for individual processing by the AM system. The cutter 112 may cut the sheet with a mechanical instrument (e.g., blade, punch) or other approach (e.g., laser) as well understood by a skilled artisan.

In examples, the AM system 100 may also include a punching device 134 for placing registration apertures in the substrate material 118 or substrate sheets 132 thereof at desired locations. The registration apertures are placed in precise, pre-defined positions relative to the position of the substrate sheet for precise alignment of the patterned marking material images printed onto the sheets. This can be accomplished by mounting the punching device 134 proximate to the substrate material 118 being moved by the transfer subsystem 114, for example, on the same frame that the image-forming device 104 and powder subsystem 106 are placed, or using other alignment mechanisms that are well known in the art. The punching device 134 may include a hard instrument that pokes registration apertures out of the substrate material, or a laser cutter that cuts registration apertures from the substrate material.

In order to complete the AM process of forming a 3D object, the powder printed substrate sheets 132 may be stacked by aligning the substrate sheets via their registration apertures, and fused together to attach the stacked substrate sheets into the combined object. Then the uncoated substrate material may be removed from the combined object by, for example, abrasive blasting, chemical removal or dissolution. The stacker subsystem 116 is configured for stacking the cut printed substrate sheets 132 in register, based on the aforementioned registration apertures. As can be seen in FIG. 1, the stacker subsystem 116 receives the printed substrate sheets 132 with the registration apertures aligned about registration pins 136 of the stacker subassembly to form a stack 138 of the printed sheets.

After stacking the printed sheets, the patterned powder on the sheets may be combined and hardened into the 3D object. FIG. 1 shows the stacker subsystem 116 including a compressive device 140 including one or more elastic components (e.g., springs 142) to maintain pressure on the substrate sheets 132 even if they compress. After a number of substrate sheets (layers) have been placed in the stacker subsystem 116, one on top of the other on bed plate 144, the inserted substrate sheets may be compressed together with the spring 142 exerting presser on top plate 146 towards the bottom bed plate.

The compressed stack 138 may be heated, for example, in an oven (not shown). Heat from the oven causes the thermoplastic powder to melt. The molten material coats the substrate layers. The compressive device 140, with the substrate stack 138 in it, is then removed from the oven, and the substrate layers are allowed to cool. The molten material then solidifies. As it does so, it binds (fuses) the substrate sheets 132 together. Excess sheet substrate (that has not been covered by the solidified material) is then removed as noted above by, for example, abrasive blasting, chemical removal or dissolution to result in a 3D printed object.

The process carried out by the AM system 100 may be sequenced and monitored using one or more controllers 150. The controller 150 may read and execute build instructions generated by an outboard computer (not depicted) based on a 3D model of the object that is to be printed. For example, the material feeder 102, image-forming device 104, powder subsystem 106, fuser 108, sensor 110, cutter 112, transfer subsystem 114, punching device 134 and stacker subsystem 116 may operate as discussed herein based on input from the controllers. Thus while the controller 150 is shown in communication with the image-forming device 104, it is understood that the controller may be in communication with any component of the AM system.

The examples include improvements to the AM system 100 described above that include a web sheet processing system for cutting and/or stacking AM composite printed sheets from the web. In embodiments, the web sheet processing system combines web edge waste with the cut sheets, stacking the waste with the 3D object. The web edge waste of the web sheets includes the substrate material closest to the outer edges of the web that may correspond to uncut portions of the web previously not separated into the printed single sheets for the AM system 100 and rewound as the substrate material waste 152. In the examples, the outer edges remain with the substrate material sheets 132 after web sheet cutting by the cutter 112. While not being limited to a particular theory, the outer edges may include tractor feed apertures 214 (FIG. 4) between the web outer edges and printing areas of the substrate material web, which will be described in greater detail below. The cut printed substrate sheets 132 of the examples that include the outer edges with tractor feed apertures 214 may be referred to below as printed substrate sheets 216.

In examples, a tractor drive transport assembly ensures consistent web/sheet motion via tractor feeding along the edges of the web/sheet to a stacker subsystem. The tractor drive transport assembly, in combination with a drive guide, positions the cut sheets over the stacker subsystem for release onto the top of a stack, with the substrate waste that would normally be processed downstream stacked with the 3D object. The web edge waste may be subsequently removed during the cleaning of the 3d object (e.g., by abrasive blasting, chemical removal, dissolution) to result in a 3D printed object. This approach eliminates the separate need for waste removal of a rewound web of substrate material waste 152. Like referenced numerals discussed above in reference to the AM system 100 designate similar or identical elements in the exemplary AM systems discussed below.

Figure 2:
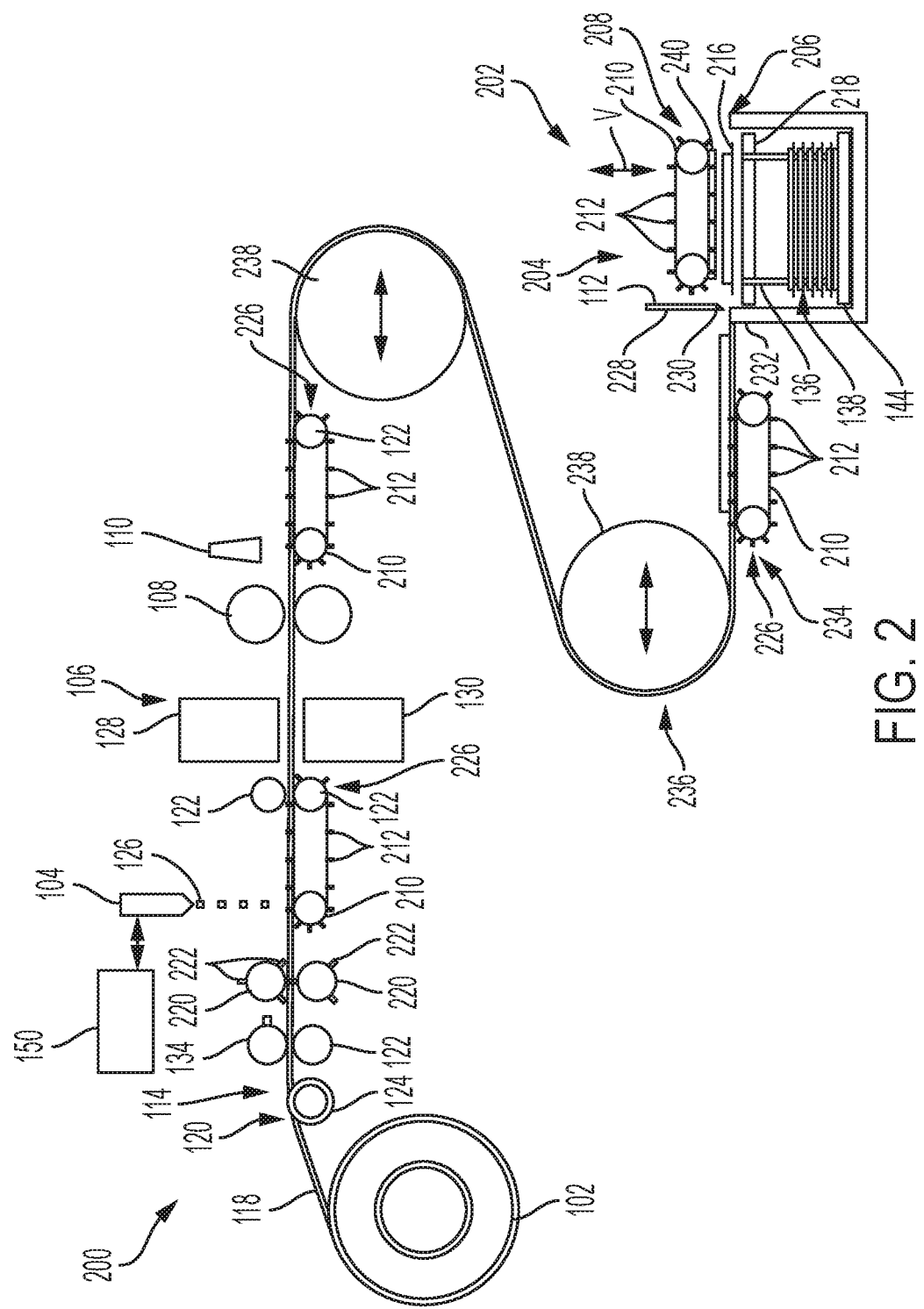
FIG. 2 is a side view of an exemplary AM system including a web sheet processing system for stacking additive manufacturing composite printed sheets.

As an example, FIG. 2 depicts an AM system 200 similar to AM system 100 that includes a web sheet processing system 202 for cutting and/or stacking AM composite printed sheets from the substrate material 118 web. The substrate material web may be unrolled from the material feeder and advanced through the AM system 200 towards the stacker subsystem 116. During this advancement, the image forming device 104, powder subsystem 106 and fuser 108 may place a printed image layer on the substrate material web, for example as discussed above, and the cutter 112 may cut the printed web into single printed layer sheets 216 prior to stacking, with the sheets corresponding to a layer of a 3D object. In examples, the web of substrate material 118 may be cut by the cutter 112 into single sheets 216 at any prior point in the process. The web sheet processing system 202 includes a tractor drive transport assembly 204 and a drive guide 206, that together place the single sheets onto the stacker subsystem, as will be described by example in greater detail below.

Figure 3:
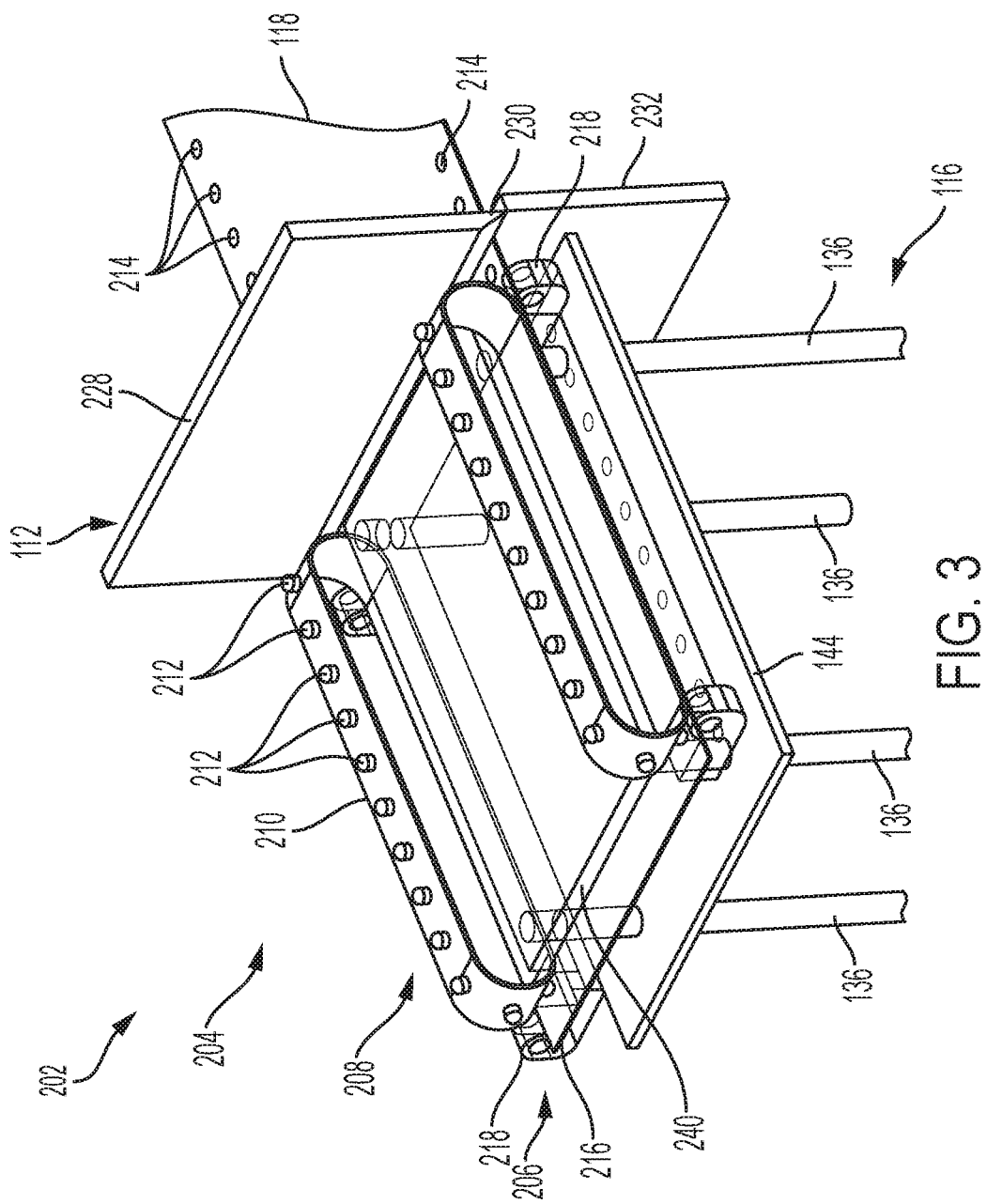
FIG. 3 is a perspective view of a web sheet processing system in accordance with examples of the embodiments.
Figure 4:
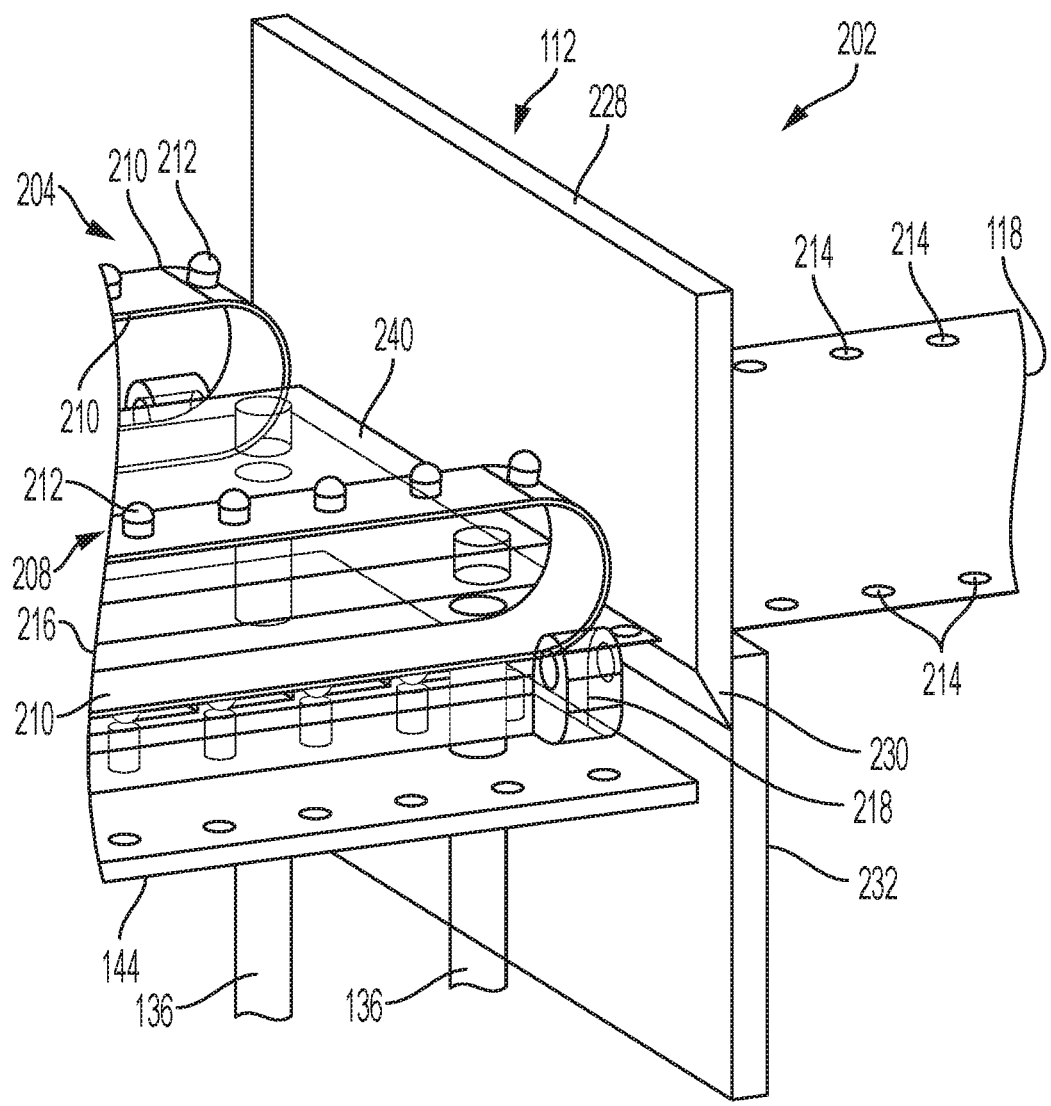
FIG. 4 is a perspective view of the web sheet processing system of FIG. 3 after a printed sheet cut.
Figure 5:
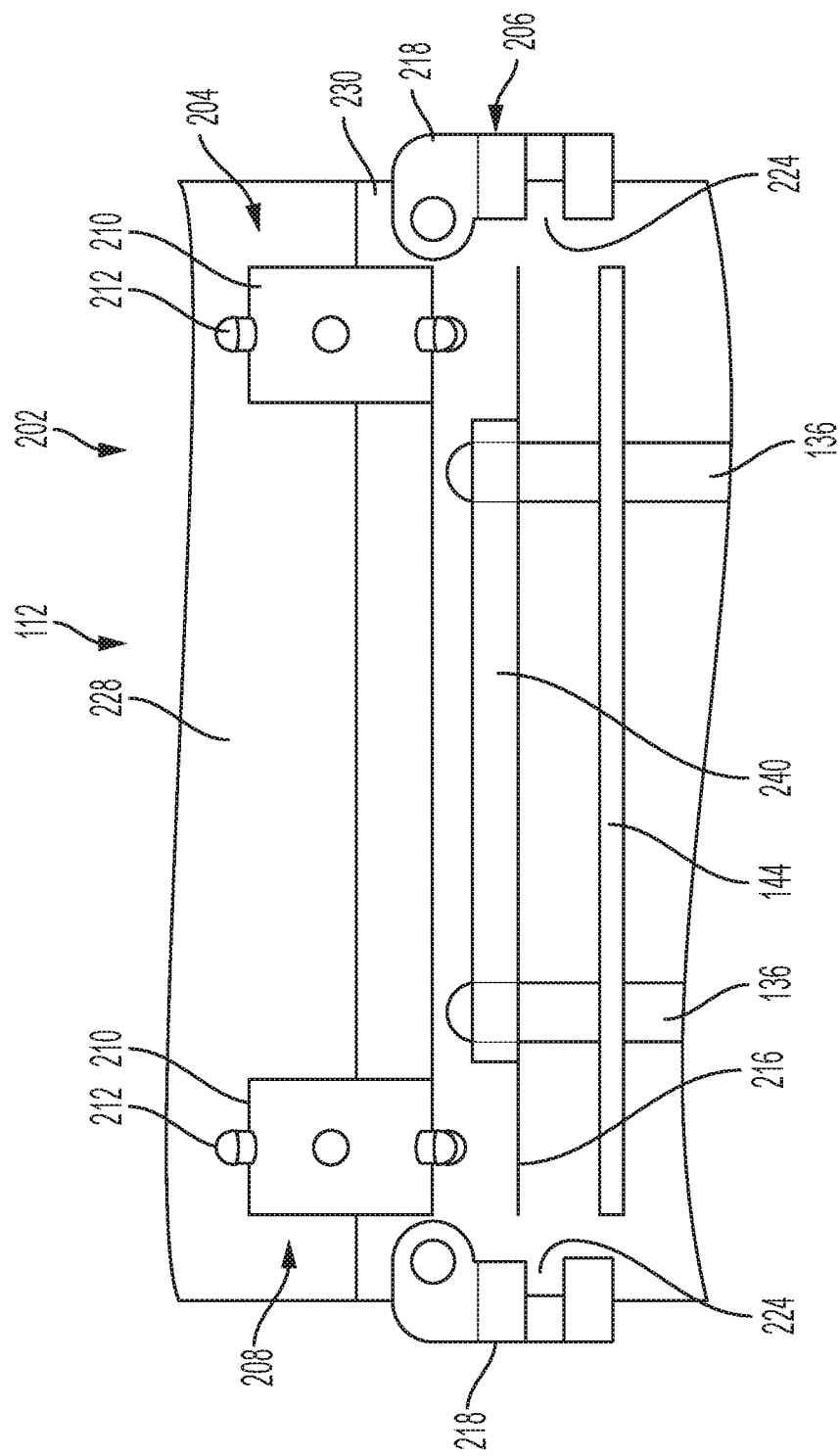
FIG. 5 is a side view of the web sheet processing system of FIG. 3.

As can be seen in FIGS. 2-6, the tractor drive transport assembly 204 may be positioned above the stacker subsystem 116 of additive manufacturing systems or devices (e.g., AM system 200, AM system 300). The tractor drive transport assembly may include a tractor drive transport 208 that has a drive belt 210. In examples the tractor drive transport may include a plurality of drive belts 210 (FIGS. 3-5). The drive belts 210 may be coupled to a motor or drive assembly (not shown) that rotates the drive belts adjacent the printed layer sheets 216 to move the printed layer sheets over the stacker subsystem 116.

To further aid the movement of the printed layer sheets 216, the drive belts 210 are shown having a plurality of knobs 212 spatially gapped and protruding outwardly from the drive belt as a knobbed tread. While not being limited to a particular theory, the knobs 212 are spaced to align with and protrude tractor feed apertures 214 of the web, with the tractor feed apertures typically sized larger than a horizontal section of the knobs so the knobs can easily engage and disengage the web and printed layer sheets thereof via insertion through and extraction from the web as desired. This engagement between the knobs 212 and apertures 214 allow the drive belts 210 to easily move the web or printed layer sheets thereof as desired through the AM system and over the stacker subsystem 116. For example, the drive belt 210 may pull the printed layer sheet 216 over the stacker subsystem until registration apertures of the printed layer sheet are in alignment over registration pins 136 of the stacker subsystem.

Figure 6:
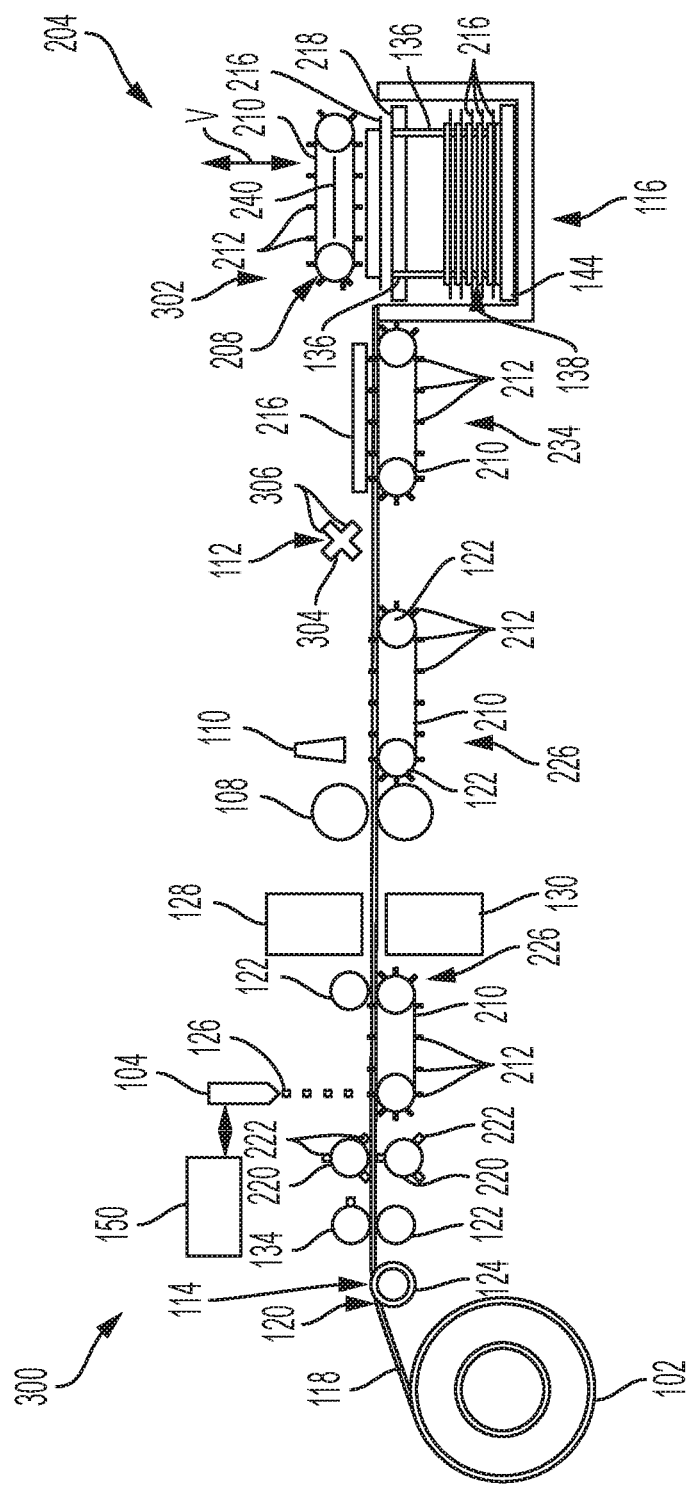
FIG. 6 is a side view of another exemplary AM system including a web sheet processing system for stacking additive manufacturing composite printed sheets.

The drive guide 206 is configured to temporarily support a composite printed layer sheet 216 while the sheet is pulled over the stacker subsystem 116. As can be seen in FIGS. 2, 5 and 6, the drive guide 206 may include a support plate or a plurality of plates 218 positioned proximal the drive belts 210 to support a printed layer sheet 216 moving over the stacker subsystem 116 until the printed layer sheet is aligned with other printed layer sheets 216 on the bed plate 144 of the stacker subsystem. For example, the printed layer sheets 216 may be aligned with other printed layer sheets on the bed plate 144 when registration apertures of the printed layer sheets are directly over corresponding registration pins 136 of the stacker subsystem 116. The plates 218 thus prevent printed layer sheets 216 from falling prematurely and randomly into the stacker subsystem, which would ruin the aesthetic appearance and physical characteristics of a resulting 3D object since layered stacked printed layer sheets would fall in a disorganized manner.

In the examples illustrated in FIGS. 2-6, the drive belts 210 of the tractor drive transport 208 are shown above the drive guides 206, with a printed layer sheet 216 therebetween. In this manner the drive guides 206 can support the printed layer sheet 216 while the drive belts 210 advance the printed layer sheet over the stacker subsystem. The drive guides 206 may each include a guide channel 224 (FIG. 5) recessed longitudinally in the drive guide in alignment with the rotating knobs 212. When the drive guides 206 are in a support position under the drive belts 210 of the tractor drive transport 208, the drive belts may rotate with knobs 212 of the drive belts interacting with the tractor feed apertures of the printed layer sheet and traversing within the guide channels 224 to move the printed layer sheet into alignment over the stacker subsystem 116.

When a printed layer sheet 216 is in alignment over the stacker subsystem, for example, with the printed layer sheet registration apertures over the registration pin of the stacker subsystem, the drive guide may be withdrawn from underneath the printed layer sheet to release the printed layer sheet from the knobs 212 of the tractor drive transport drive belts 210 to the stacker subsystem. Upon release from the tractor drive transport, the printed layer sheet 216 is free to fall into the stacker subsystem, for example, with the registration apertures of the printed layer sheets about corresponding registration pins 136 of the stacker subsystem. The drive guide may be withdrawn from underneath a printed layer sheet, for example by rotating or translating the drive guide away from a support position (FIGS. 2, 3) under the printed layer sheet to a recessed position (FIG. 5) away from the printed layer sheet.

While not being limited to a particular theory, the tractor drive transport assembly 204 may be part of the transfer subsystem 114 or separate from the transfer subsystem. Referring to FIG. 2, the transfer subsystem 114 supports and forwards the printed substrate material web in a process direction towards the tractor drive transport assembly 204. The substrate material web may also include tractor feed apertures 214. The tractor feed apertures may be part of the substrate material web 118 before it is placed at the material feeder 102, or the tractor feed apertures may be formed during the AM process. For example, a rotary punch 220 or other aperture producing device may be positioned adjacent the substrate material web 118 to form the tractor feed apertures between the outer edges of the web and printing areas of the web. The rotary punch 220 is shown in FIG. 2 between the punching device 134 and the image forming device 104. However the punching device 134 is not limited to that location and may be located elsewhere proximate the substrate material web 118 and upstream the tractor drive transport assembly 204 to form the tractor feed apertures in the web. In examples, the rotary punch may include a plurality of punch tubes 222 having pins configured to pierce the substrate material web to form the plurality of tractor feed apertures therein, as well understood by a skilled artisan. For example, as the substrate material web 118 is forwarded by the transfer subsystem 114 through the AM system, the rotary punch 220 may rotate in the processing direction of the moving web, and the punch tubes 222 may punch holes in the substrate material web that form the tractor feed apertures.

The transfer subsystem 114 may include additional tractor drive transports 224 upstream the tractor drive transport assembly 204 that move the substrate material web 118 along its intended processing direction path towards the stacker subsystem 116. The additional tractor drive transports 226 may include drive belts 210 with knobs 212 spatially gapped and extending outwardly to protrude tractor feed apertures 214 of the web proximate the drive belt and forward the printed substrate material web in the process direction. The additional tractor drive transports 226 may provide full control of the movement and tension of the web once the substrate material web 118 having tractor feed apertures is in the tractor feed control the knobbed drive belts 210. While not being limited to a particular orientation, in examples, the additional tractor drive transport drive belts 210 are shown below the web, which may rest on the drive belts 210 via gravity.

While not being limited to a particular position along the transfer subsystem 114, the cutter 112 is shown as a web sheet cutter in FIGS. 2-5 proximate the stacker subsystem 116. For example, the web cutter 112 can be seen in FIGS. 2-5 extending across an entire width of the printed substrate material web to cut printed layer sheets 216 from the printed substrate material web. The cutter 112 may include a web knife 228 with a descending blade 230 (e.g., guillotine blade, paper cutter style shear) extending downwards to cut the web against a lower support 232. In examples, the lower support 232 may be a wall of the stacker subsystem 116 or a separate cutting aid support. The web knife 228 may slice the web into printed layer sheets 216 by sliding (e.g., vertically downwards) through the web and along the lower support (FIG. 4).

When separating the web into printed layer sheets 216 with the web knife 228 shown in FIGS. 2-5, it may be beneficial to momentarily stop the movement of the substrate material web 118 at the web knife 228. Referring to FIG. 2, an additional tractor drive transport 224 also referred to as the second tractor drive transport 234 is positioned upstream and proximate to the web knife 228. The drive belts 210 of the second tractor drive transport support the material substrate web 118 and move the web via interaction of the knobs 212 through tractor feed apertures 214 of the web towards the tractor drive transport assembly 204. During a cutting across the web via the cutter 112, the drive belts 210 of the second tractor drive transport 234 may stop momentarily to allow a precise cut by the web knife 228. The drive belts 210 of the tractor drive transport assembly 204 may also stop momentarily during the cut.

Still referring to FIG. 2, the momentary stops should not affect constant printing of substrate material through the image-forming device 104 and the powder subsystem 106 of the AM system 200. Accordingly, the transfer subsystem 114 may also include a buffer zone 236 configured to keep the printed substrate material web taut regardless of the web cutting operation. The buffer zone may include one or more rotating pulley rollers 238 that urge away from each other to keep material substrate web 118 taut in "U" or "S" shaped loops as the web moves in the process direction to the stacker subsystem 116.

FIGS. 3-5 depict an exemplary web sheet processing system 220 during and after a web sheet cut. In FIG. 3, the drive belts 210 pull a sheet length of the substrate material web over the stacker subsystem 116, with the drive guide under the web to support the sheet. In FIG. 4, the web knife 228 shifts downward to cut the printed layer sheet 216. Upon separation of the printed layer sheet 216, the drive belts 210 may complete any desired movement of the sheet until registration apertures of the printed layer sheet are in alignment over registration pins 136 of the stacker subsystem 116. Upon reaching this alignment, the drive belts 210 may momentarily stop. The drive guide plates 218 move from its support position under the printed layer sheet 216 to a withdrawn position away from the printed layer sheet. For example, the drive guide may pivot to the withdrawn position (FIG. 5) to release the printed layer sheet 216 from the tractor drive transport. In other examples, the drive guide may translate away from the support position to release the composite printed layer sheet 216 from the tractor drive transport. Upon release of the printed layer sheet 216 from the drive belt 210 of the tractor drive transport assembly 204, the assembly is reactivated to feed another sheet over the stacker subsystem.

The web sheet processing system 202 may further include a knockdown member 240 proximate the tractor drove transport assembly 204. For example, the knockdown member 240 may be transversely movable between an upward position and a downward position while remaining above the printed layer sheet 216 to push the printed layer sheet downwards onto the bed plate 144 or onto another one of the composite printed layer sheets stacked over the bed plate. While not being limited to a particular configuration, the knockdown member 240 may be shaped as a plate and/or as one or more annular rings sized to contact the printed layer sheet in an annular zone around the registration apertures. For example, the knockdown member 240 may include a plate having annular internal walls aligned with registration pins 136 of the stacker subsystem 116. The annular internal walls may be defined by columnar apertures having a transverse sectional diameter at least the horizontal size of the registration pins 136, so the knockdown member 240 can be depressed down to the bed plate 144 or to the top of a stack of the printed layer sheets 216 with the annular internal walls sliding about the registration pins. If desired, the knockdown member 240 may advance into the stacker subsystem 116 to move the printed layer sheet into contact with the bedplate or top of the stack of printed layer sheets.

In examples, the drive belts 210 may be configured to shift (e.g., vertically) towards and away from the stacker subsystem 116 to periodically engage and move the web or printed layer sheet 216 thereof over the stacker subsystem. While not being limited to a particular theory, the drive belts 210 may be coupled to a power source and/or mechanical device structured to lift and lower the drive belts, as well understood by a skilled artisan. The drive belts 210 may be lowered to a level at or just above the web or printed layer sheet 216 thereof. At this lowered level, the knobs 212 of the drive belts 210 can protrude through the tractor feed apertures 214 of the web/printed layer sheet to move the web/printed layer sheet over the stacker subsystem 116 upon rotation of the drive belts. After the drive belts 210 move the web/printed layer sheet into alignment over the stack of printed layer sheets (or over the bed plate 144 if the moved printed layer sheet is the first sheet of the stack) so that the registration apertures of the sheet are aligned over corresponding registration pins 136, the drive belts 210 may be spatially lifted from the lowered level to a higher level. At this higher level the drive belts 210 and attached knobs 212 may be above the plane of the moved printed layer sheet 216. The lifting or upwards shifting of the drive belts may pull the knobs 212 out of the printed layer sheet tractor feed apertures 214 and release the printed layer sheet from engagement with the tractor drive transport assembly 204.

FIG. 6. depicts an AM system 300 similar to AM system 200 that includes a web sheet processing system 302 for cutting and/or stacking AM composite printed sheets from the substrate material 118 web. The web sheet processing system 302 includes a cutter 112 that may be different than the guillotine style descending blade 230 of web knife 228 described with reference to FIGS. 2-5. In particular, the cutter 112 illustrated in FIG. 6 may be configured to cut across the full width of the substrate material web 118 to form printed layer sheets 132 while the substrate material web is moving along the process direction by the transfer subsystem 114. In examples, the cutter 112 may include a rotating web knife 304 having one or more blades 306 configured to cut the substrate material web 118 while the web knife is rotating with the moving web. In examples, the cutter 112 may include a water jet cutter, a laser cutter or some other single point cutter that may cut across the substrate material web 118 while the web is moving. In examples, the cutter may include any of the above discussed cutters that can make a cut perpendicular to the web side edge but angled to the process direction, with the angle being determined by the relation of the web feed speed and the speed the cutter is moved across the web, as readily understood by a skilled artisan.

Since the cutter 112 depicted in FIG. 6 can separate the substrate material web 118 into the printed layer sheets 216 while the substrate material moves, cutting the web may be accomplished without the transfer subsystem 114 stopping the web. This means that the transfer subsystem 114 does not need a buffer zone 236 as illustrated by example in FIG. 2, as the transfer subsystem can keep the substrate material web taut throughout the additive manufacturing process provided by the AM system 300. The transfer subsystem 114 may still include additional tractor drive transports 226 along the path of the material substrate web 118 to move the web continuously along the processing direction to the stacker subsystem 116. Tractor drive transports 226 may be positioned proximate the desired web cut on opposite sides thereof to keep the web taught throughout operation.

Figure 7:
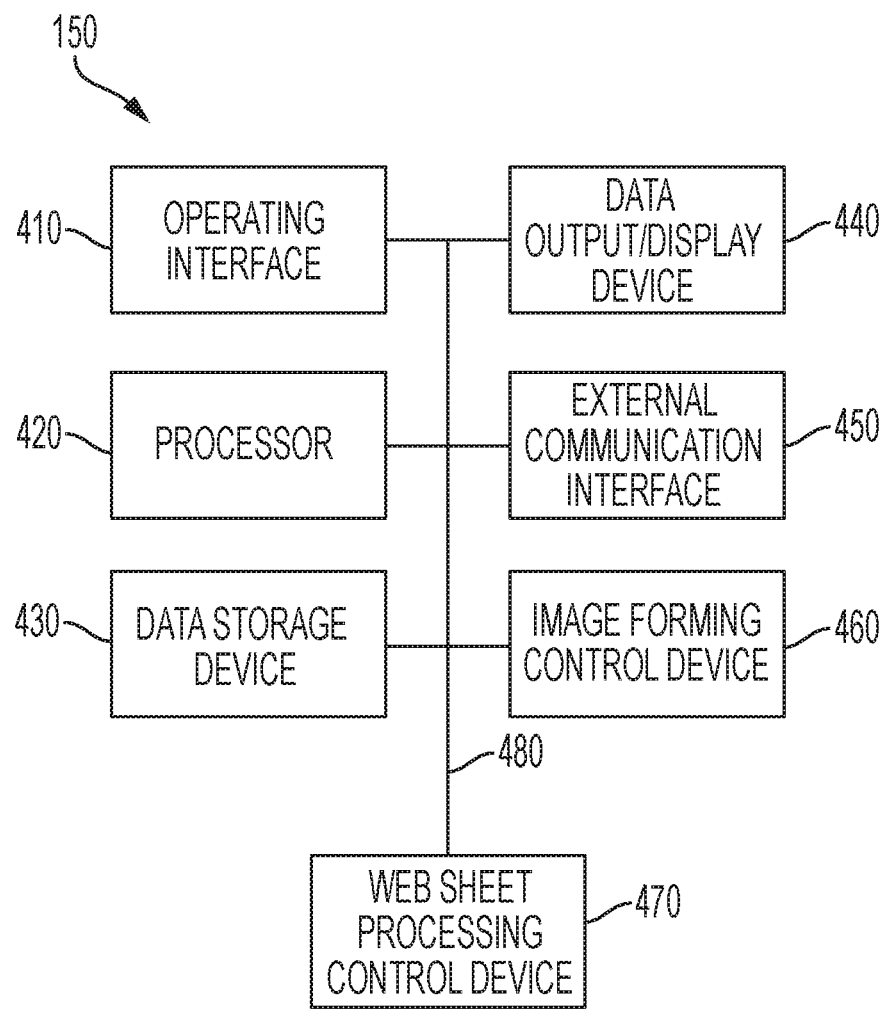
FIG. 7 illustrates a block diagram of an exemplary control system for implementing a composite based additive manufacturing sewing scheme.

FIG. 7 illustrates a block diagram of the controller 150 for executing instructions to automatically control exemplary devices in the AM systems 100, 200, 300 100 and web sheet processing systems 202, 302 illustrated in FIGS. 1-6. The exemplary controller 150 may provide input, to or be a component of a controller for executing the AM 3D object forming process in a system such as that depicted in FIGS. 1-6 and described in greater detail below in FIG. 8.

The exemplary control system 150 may include an operating interface 410 by which a user may communicate with the exemplary control system 150. The operating interface 410 may be a locally-accessible user interface associated with the AM 3D object forming system 200, 300 and sheet processing system 202, 302. The operating interface 410 may be configured as one or more conventional mechanism common to control devices and/or computing devices that may permit a user to input information to the exemplary control system 150. The operating interface 410 may include, for example, a conventional keyboard, a touchscreen with "soft" buttons or with various components for use with a compatible stylus, a microphone by which a user may provide oral commands to the exemplary control system 150 to be "translated" by a voice recognition program, or other like device by which a user may communicate specific operating instructions to the exemplary control system 150. The operating interface 410 may be a part or a function of a graphical user interface (GUI) mounted on, integral to, or associated with, the AM system 200, 300 and web sheet processing system 202, 302 with which the exemplary control system 150 is associated.

The exemplary control system 150 may include one or more local processors 420 for individually operating the exemplary control system 150 and for carrying into effect control and operating functions for AM 3D object forming, including implementing composite-based layer forming schemes, and printed layer sheet cutting, delivery and stacking with the AM system and web sheet processing system with which the exemplary control system 150 may be associated. Processor(s) 420 may include at least one conventional processor or microprocessor that interpret and execute instructions to direct specific functioning of the exemplary control system 150, and control of the AM 3D object forming process and/or the web sheet processing with the exemplary control system 150.

The exemplary control system 150 may include one or more data storage devices 430. Such data storage device(s) 430 may be used to store data or operating programs to be used by the exemplary control system 150, and specifically the processor(s) 420. Data storage device(s) 430 may be used to store information regarding, for example, one or more 3D object models for producing 3D objects in an AM system with which the exemplary control system 150 is associated. Stored 3D object model information may be devolved into data for the printing of a series of layers of 2D slices and web sheet processing for forming the 3D object in the manner generally described by example herein.

The data storage device(s) 430 may include a random access memory (RAM) or another type of dynamic storage device that is capable of storing updatable database information, and for separately storing instructions for execution of AM system operations by, for example, processor(s) 420. Data storage device(s) 430 may also include a read-only memory (ROM), which may include a conventional ROM device or another type of static storage device that stores static information and instructions for processor(s) 420. Further, the data storage device(s) 430 may be integral to the exemplary control system 150, or may be provided external to, and in wired or wireless communication with, the exemplary control system 150, including as cloud-based data storage components.

The exemplary control system 150 may include at least one data output/display device 440, which may be configured as one or more conventional mechanism that output information to a user, including, but not limited to, a display screen on a GUI of the AM system 200, 300 and/or the web sheet processing system 202, 302 with which the exemplary control system 150 may be associated. The data output/display device 440 may be used to indicate to a user a status of a 3D object forming operation effected by the AM system/web sheet processing system with which the exemplary control system 150 may be associated including an operation of one or more individually controlled components at one or more of a plurality of separate processing stations or subsystems in the systems.

The exemplary control system 150 may include one or more separate external communication interfaces 450 by which the exemplary control system 150 may communicate with components that may be external to the exemplary control system such as the web sheet processing system 202, 302. At least one of the external communication interfaces 450 may be configured as an input port to support connecting an external CAD/CAM device storing modeling information for execution of the control functions in the 3D object forming operations. Any suitable data connection to provide wired or wireless communication between the exemplary control system 150 and external and/or associated components is contemplated to be encompassed by the depicted external communication interface 450.

The exemplary control system 150 may include an image forming control device 460 that may be used to control the image forming process on the substrate material 118 (e.g., image forming device 104, powder subsystem 106, fuser 108) which produces the series of 2D slices (e.g., printed substrate sheets 132, printed layer sheets 216) for the in-process 3D object according to devolved 3D object modeling information. The substrate material 118 may be fed through the image forming device 104, powder subsystem 106 and fuser 108 to have marking material images formed thereon under the control of the image forming control device 460. The substrate material may exit the powder subsystem 106 as a printed substrate web and be cut and automatically stacked at an output side of the AM system 200, 300 via the web sheet processing system 202, 302 in order to constitute a stack of the printed sheets 138 for forming an object. The image forming control device 460 may operate as a part or a function of the processor 420 coupled to one or more of the data storage devices 430, or may operate as a separate stand-alone component module or circuit in the exemplary control system 150. Either of the processor 420 or the image forming control device 460 may parse the input 3D object model information to determine and execute a layer-by-layer 2D slice material layer printing scheme on the substrate material 118 in the AM system 200, 300.

The exemplary control system 150 may include a web sheet processing control device 470 coupled to one or more of the data storage devices 430, or as a separate stand-alone component module or station in the exemplary control system 150. In instances in which the printed substrate material web is to be used for web sheet cutting, delivery and stacking, the same exemplary control system 150, through the web sheet processing system 202, 302, may be usable to control the web sheet cutting, delivery and stacking process. In such instances, the web sheet processing system 202, 302, may be usable to separate printed layer sheets 216 from the printed substrate web as it is fed past the cutter, to deliver (e.g., move, forward) the printed layer sheets over the stacker subsystem 116, and to stack the printed layer sheets in precise alignment as the stack 138 for later use. The web sheet processing control device 470 may control a rate at which the web is fed to the cutter 112 for severing printed layer sheets 216 therefrom, including temporarily halting the tractor drive transports 208, 234 if necessary during a web cutting operation. Heating and further pressing the stack 138 may be provided subsequently off line as needed to not slow down the image forming process and web sheet processing.

The exemplary control system 150 may include a 3D object finisher control device (not shown) for executing a final 3D object shaping scheme on a processed stack of sewn printed sheet layered batches in a subtractive machining process that may remove the layered support component structure and surface finish the 3D object. As with the above-enumerated other separate control devices, the 3D object finisher control device may operate as a part or a function of the processor 420 coupled to one or more data storage devices 430 for executing finishing device operations, or may operate as a separate stand-alone component module or circuit in the exemplary control system 150.

All of the various components of the exemplary control system 150, as depicted in FIG. 7, may be connected internally, and to one or more AM object forming devices and/or components thereof, by one or more data/control busses 480. These data/control busses 480 may provide wired or wireless communication between the various components of the exemplary control system 150, whether all of those components are housed integrally in, or are otherwise external and connected to an AM system 100 with which the exemplary control system 150 may be associated.

It should be appreciated that, although depicted in FIG. 7 as an integral unit, the various disclosed elements of the exemplary control system 150 may be arranged in any combination of sub-systems as individual components or combinations of components, integral to a single unit, or external to, and in wired or wireless communication with the single unit of the exemplary control system. In other words, no specific configuration as an integral unit or as a support unit is to be implied by the depiction in FIG. 7. Further, although depicted as individual units for ease of understanding of the details provided in this disclosure regarding the exemplary control system 150, it should be understood that the described functions of any of the individually-depicted components, and particularly each of the depicted control devices, may be undertaken, for example, by one or more processors 420 connected to, and in communication with, one or more data storage device(s) 430.

Figure 8:
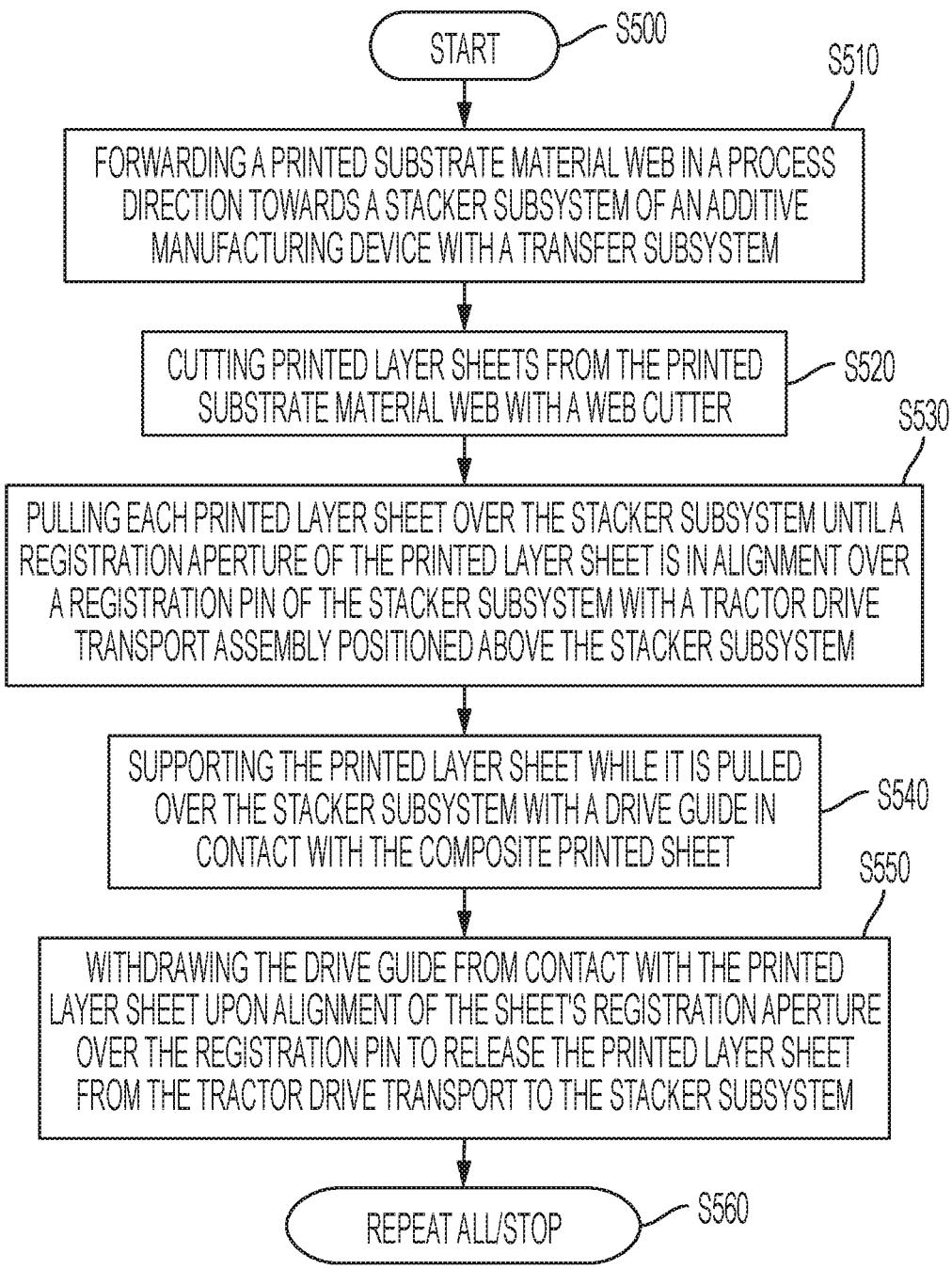
FIG. 8 is a flowchart depicting the operation of an exemplary method for sewing printed sheets to bond a stack of the printed sheets.

The disclosed embodiments may include an exemplary method for web sheet processing with an AM system 200, 300. FIG. 8 illustrates a flowchart of such an exemplary web sheet processing method during composite based additive manufacturing, which commences at Step S500 and proceeds to Step S510.

At Step S510, a transfer subsystem 114 forwards a printed substrate material web in a process direction towards a stacker subsystem of an additive manufacturing system 200, 300 or device thereof. Operation of the method proceeds to Step S520, where a web cutter 112 cuts and separates printed layer sheets 216 from the printed substrate material web. The web cutting may extend across an entire width of the printed substrate material web, and may terminate the printed substrate material with only the separated printed layer sheets continuing downstream the web cutter. The web cutter may be positioned adjacent the web at any point proximate the transfer subsystem before the stacker subsystem. Operation of the method proceeds to Step S530.

At Step S530, a tractor drive transport assembly positioned above the stacker subsystem individually pulls each printed layer sheet over the stacker subsystem until a registration aperture of the pulled printed layer sheet is in alignment over a registration pin of the stacker subsystem. The tractor drive transport assembly may include a tractor drive transport having a drive belt with knobs spatially gapped and protruding outwardly from the drive belt. The knobs are spaced to align with and protrude tractor feed apertures spaced in the printed layer sheets. The drive belt is configured to pull the printed layer sheet over the stacker subsystem until registration apertures of the pulled printed layer sheet are in alignment over corresponding registration pins of the stacker subsystem.

Operation of the method shown in FIG. 8 proceeds to Step S540, where a drive guide under the pulled printed layer sheet supports the printed layer sheet while it is pulled over the stacker subsystem. Operation of the method proceeds to Step S550, where the drive guide is withdrawn from contact with the printed layer sheet upon alignment of the sheet's registration apertures over the corresponding registration pins. This withdrawal of the drive guide allows the releases of the printed layer sheet from the tractor drive transport in alignment to form a stack of the printed layer sheets on the stacker subsystem.

Operation may repeat back to Step S510 to increment the stack with additional printed layer sheets until the stack is completed. Then the stack is ready for subsequent processing, such as heating, compressing and cleaning as discussed above.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 8, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of image forming elements common to 3D inking system in many different configurations. For example, although single-pass marking material deposition is shown in the discussed embodiments, the examples may apply to multi-pass systems and methods, including 3d object forming systems and methods. Also, while single-side printing is shown in the discussed embodiments, the examples may apply to multi-sided printing. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A web sheet processing system for stacking additive manufacturing composite printed sheets, comprising:
a tractor drive transport assembly positioned above a stacker subsystem of an additive manufacturing device, the stacker subsystem including a base and a registration pin extending upwards from the base, the tractor drive transport assembly including a first tractor drive transport having a drive belt with a plurality of knobs spatially gapped and protruding outwardly from the drive belt, the plurality of knobs being spaced; and a drive guide positioned between the tractor drive transport and the stacker subsystem, the drive guide operably independent of the drive belt.

2. A web sheet processing system for stacking additive manufacturing composite printed sheets, comprising:
- a tractor drive transport assembly positioned above a stacker subsystem of an additive manufacturing device, the stacker subsystem including a base and a registration pin extending upwards from the base, the tractor drive transport assembly including a first tractor drive transport having a drive belt with a plurality of knobs spatially gapped and protruding outwardly from the drive belt, the plurality of knobs being spaced to align with and protrude a plurality of tractor feed apertures in one of a plurality of composite printed sheets, the drive belt configured to pull the composite printed sheet over the stacker subsystem until a registration aperture of the composite printed sheet is in alignment over the registration pin of the stacker subsystem;
- a drive guide configured to temporarily support the composite printed sheet while the composite printed sheet is pulled over the stacker subsystem, the drive guide withdrawing from contact with the composite printed sheet upon alignment of the registration aperture over the registration pin to release the composite printed sheet from the first tractor drive transport to the stacker subsystem with the registration pin through the registration aperture; and
- a transfer subsystem that supports and forwards a printed substrate material web in a process direction towards the tractor drive transport assembly, the printed substrate material web including additional tractor feed apertures, the transfer subsystem including the tractor drive transport assembly and a second tractor drive transport upstream the tractor drive transport, the second tractor drive transport having a second drive belt with a plurality of knobs spatially gapped and protruding outwardly from the second drive belt to protrude the additional tractor feed apertures and forward the printed substrate material web in the process direction.

3. The system of claim 2, further comprising a web cutter upstream the tractor drive transport assembly, the web cutter extending across an entire width of the printed substrate material web to cut the plurality of composite printed sheets from the printed substrate material web.

4. The system of claim 3, wherein web cutter is positioned between the tractor drive transport assembly and the second tractor drive transport, the second drive belt being configured to stop during a web cutting operation where the web cutter separates the composite printed sheet from the printed substrate material web.

5. The system of claim 4, the transfer subsystem further including a buffer zone configured to keep the printed substrate material web taut regardless of the web cutting operation.

6. The system of claim 3, wherein the substrate material web moves in the process direction to the web cutter and terminates at the web cutter with only the plurality of cut composite printed sheets continuing downstream the web cutter.

7. The system of claim 3, further comprising an image forming device upstream the web cutter in the process direction for printing a plurality of polymer images on the substrate material web, wherein the web cutter cuts composite printed sheets from the substrate material web having the plurality of polymer images thereon, with individual ones of the plurality of composite printed sheets including at least one of the plurality of polymer images as a layer of an additive manufacturing composite object.

8. The system of claim 1, wherein the drive belt is configured to shift towards the stacker subsystem for engagement of the plurality of knobs with a plurality of tractor feed apertures of one of the composite printed sheets to pull the composite printed sheet over the stacker subsystem, and the drive belt is configured to shift away from the stacker subsystem to release the plurality of knobs from engagement with the plurality of tractor feed apertures.

9. The system of claim 1, further comprising a knockdown member transversely movable between an upward position and a downward position, the knockdown member configured to push one of the composite printed sheets having a registration aperture over the registration pin downwards onto another one of the composite printed sheets stacked over the base.

10. The system of claim 1, wherein the drive guide is configured to pivot from a support position to a withdrawn position to release one of the composite printed sheets from the tractor drive transport.

11. The system of claim 1, wherein the drive guide is configured to translate from a support position to a withdrawn position to release one of the composite printed sheets from the tractor drive transport.

12. The system of claim 2, further comprising a rotary punch adjacent the substrate material web upstream the tractor drive transport assembly, the rotary punch including a plurality of punch tubes configured to pierce the substrate material web to form the plurality of tractor feed apertures therein.

13. A web sheet processing method for stacking additive manufacturing composite printed sheets using the web sheet processing system of claim 1, the method comprising:
a) pulling one of the composite printed sheets over the stacker subsystem until a registration aperture of the composite printed sheet is in alignment over the registration pin of the stacker subsystem with the tractor drive transport assembly positioned above the stacker subsystem, the plurality of knobs being spaced to align with and protrude a plurality of tractor feed apertures in one of the composite printed sheets, the drive belt configured to pull the composite printed sheet over the stacker subsystem until the registration aperture of the composite printed sheet is in alignment over the registration pin of the stacker subsystem;
b) supporting the composite printed sheet while the composite printed sheet is pulled over the stacker subsystem with the drive guide in contact with the composite printed sheet; and
c) withdrawing the drive guide from contact with the composite printed sheet upon alignment of the registration aperture over the registration pin to release the composite printed sheet from the tractor drive transport to the stacker subsystem.

14. The method of claim 13, further comprising forwarding a printed substrate material web in a process direction towards the tractor drive transport assembly with a transfer subsystem, the printed substrate material web including additional tractor feed apertures, the transfer subsystem including the tractor drive transport assembly and a second tractor drive transport upstream the first tractor drive transport, the second tractor drive transport having a second drive belt with a plurality of knobs spatially gapped and protruding outwardly from the second drive belt to protrude the additional tractor feed apertures and forward the printed substrate material web in the process direction.

15. The method of claim 13, further comprising cutting the plurality of composite printed sheets from a printed substrate material web with a web cutter upstream the tractor drive transport assembly, the web cutting extending across an entire width of the printed substrate material web, the cutting terminating the printed substrate material web at the web cutter with only the plurality of cut composite printed sheets continuing downstream the web cutter.

16. The method of claim 14, further comprising temporarily stopping the second drive belt and the forwarding of the printed substrate material web during a cutting of the printed substrate material web.

17. The method of claim 13, further comprising shifting the drive belt towards the stacker subsystem for engagement of the plurality of knobs with the plurality of tractor feed apertures to pull the composite printed sheet over the stacker subsystem, and shifting the drive belt away from the stacker subsystem to release the plurality of knobs from engagement with the plurality of tractor feed apertures.

18. The method of claim 13, further comprising pushing the composite printed sheet having the registration aperture over the registration pin downwards onto another one of the composite printed sheets stacked over the base with a knockdown member transversely movable between an upward position and a downward position.

19. The method of claim 13, wherein the step c) includes one of pivoting and translating the drive guide from a support position to a withdrawn position to release the composite printed sheet from the first tractor drive transport.

20. A web sheet processing system of an additive manufacturing system, comprising:
a transfer subsystem that supports and forwards a substrate material web in a process direction through the additive manufacturing system, the substrate material web having two edges defining a width of the substrate material web and a plurality of tractor feed apertures;
a web cutter extending across the width of the substrate material web to cut a plurality of composite printed sheets from the substrate material web, each of the plurality of composite printed sheets including a registration aperture and at least two of the plurality of tractor feed apertures;
a stacker subsystem downstream the web cutter in the process direction, the stacker subsystem including a base and a registration pin extending upwards from the base;
a tractor drive transport assembly positioned above a stacker subsystem, the tractor drive transport assembly including a first tractor drive transport having a drive belt with a plurality of knobs spatially gapped and protruding outwardly from the drive belt, the plurality of knobs being spaced to engage the plurality of tractor feed apertures in the plurality of composite printed sheets, the drive belt configured to pull one of the composite printed sheets over the stacker subsystem until the registration aperture of the composite printed sheet is in alignment over the registration pin of the stacker subsystem; and
a drive guide configured to temporarily support the composite printed sheet being pulled by the drive belt over the stacker subsystem, the drive guide withdrawing from contact with the composite printed sheet upon alignment of the registration aperture over the registration pin to release the composite printed sheet from the first tractor drive transport to the stacker subsystem with the registration pin through the registration aperture,
the transfer subsystem including a second tractor drive transport upstream the tractor drive transport assembly, the second tractor drive transport having a second drive belt with a plurality of knobs spatially gapped and protruding outwardly from the second drive belt to engage the plurality of tractor feed apertures of the substrate material web and forward the substrate material web in the process direction.

* * * * *